United States Patent
Bertken

(10) Patent No.: US 12,203,618 B2
(45) Date of Patent: *Jan. 21, 2025

(54) BROAD VIEW HEADLAMP

(71) Applicant: Infinity X1 LLC, Carlsbad, CA (US)

(72) Inventor: Dennis Bertken, Carlsbad, CA (US)

(73) Assignee: Infinity X1 LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,121

(22) Filed: Nov. 6, 2023

(65) Prior Publication Data

US 2024/0068636 A1 Feb. 29, 2024

Related U.S. Application Data

(63) Continuation of application No. 17/804,749, filed on May 31, 2022, now Pat. No. 11,852,311, which is a
(Continued)

(51) Int. Cl.
*F21S 41/25* (2018.01)
*F21S 41/143* (2018.01)
(Continued)

(52) U.S. Cl.
CPC ............. *F21S 41/25* (2018.01); *F21S 41/143* (2018.01); *F21V 14/02* (2013.01); *F21Y 2115/10* (2016.08)

(58) Field of Classification Search
CPC ......... F21S 41/25; F21S 41/143; F21V 14/02; F21V 23/0464; F21V 23/0492;
(Continued)

(56) References Cited

U.S. PATENT DOCUMENTS 1,034,492 A 8/1912 Nielsen
5,408,393 A 4/1995 Becker
(Continued)

FOREIGN PATENT DOCUMENTS

CN 101725884 A 6/2010
CN 202118535 U 1/2012
(Continued)

OTHER PUBLICATIONS

Black Diamond, Black Diamond ReVolt 350 Headlamp, REI Website (Link: https://www.rei.com/product/170741/black-diamond-revolt-350-headlamp?color=AZUL), US.
(Continued)

*Primary Examiner* — Elmito Breval
(74) *Attorney, Agent, or Firm* — Wang Hardoon, P.C.

(57) ABSTRACT

The broad view headlamp includes a plurality of light sources that illuminate an area in front of the headlamp, an area adjacent to each side of the headlamp, and an area below the headlamp. The headlamp includes a number of lighting modes, such that any one of the light sources can be operated individually or in combination with any one or more of the remaining light sources. The headlamp housing has multiple lighting compartments, each having one or more light sources disposed therein. Each compartment includes an optical lens. The various light sources, together with the optical lenses, allow the headlamp to illuminate a view area extending to, at least, the outer boundaries of the far peripheral vision of the human eye, i.e., 110 degrees to the right and left of center. Thus, the total combined view area illuminated by the headlamp is at least 220 degrees.

20 Claims, 5 Drawing Sheets

Related U.S. Application Data continuation of application No. 17/315,292, filed on May 8, 2021, now Pat. No. 11,384,913.

(60) Provisional application No. 63/022,487, filed on May 9, 2020.

(51) Int. Cl.
 *F21V 14/02* (2006.01)
 *F21Y 115/10* (2016.01)

(58) Field of Classification Search
 CPC .... F21V 5/006; F21V 21/084; F21V 23/0414; F21Y 2115/10; F21Y 2113/00; F21Y 2107/00
 See application file for complete search history.

(56) References Cited

U.S. PATENT DOCUMENTS

| | | | |
|---|---|---|---|
| 6,481,869 | B1 | 11/2002 | Horandel et al. |
| 6,955,444 | B2 | 10/2005 | Gupta |
| 7,121,676 | B1 | 10/2006 | Kutnyak |
| 7,192,165 | B2 | 3/2007 | Petzl et al. |
| 7,226,190 | B2 | 6/2007 | Petzl et al. |
| 8,378,587 | B2 | 2/2013 | Huguenin et al. |
| D711,028 | S | 8/2014 | Pritchett |
| 9,458,985 | B2 | 10/2016 | Pritchett |
| 9,534,750 | B2 | 1/2017 | Pritchett |
| 10,794,549 | B2 | 10/2020 | Pritchett |
| 10,794,550 | B2 | 10/2020 | Pritchett |
| 2006/0087842 | A1 | 4/2006 | Alessio |
| 2009/0251070 | A1 | 10/2009 | Petzl et al. |
| 2010/0181940 | A1 | 7/2010 | Bucalo |
| 2014/0146552 | A1 | 5/2014 | Hui |
| 2014/0198484 | A1 | 7/2014 | Feustel et al. |
| 2014/0085872 | A1 | 11/2014 | Taylor |
| 2014/0334132 | A1 | 11/2014 | Ferguson |
| 2019/0083739 | A1 | 3/2019 | Jeannin |
| 2019/0150249 | A1 | 5/2019 | Bertken et al. |
| 2019/0213716 | A1 | 7/2019 | Oniki |
| 2020/0003371 | A1 | 1/2020 | Ganahl |
| 2020/0248896 | A1 | 8/2020 | Gall et al. |

FOREIGN PATENT DOCUMENTS

| | | |
|---|---|---|
| CN | 103629541 A | 3/2014 |
| CN | 107990267 A | 5/2018 |
| EP | 2827684 B1 | 8/2018 |
| GB | 2499433 A | 8/2013 |
| JP | 2018092922 A | 6/2018 |
| KR | 101981248 B1 | 5/2019 |
| WO | 2006080918 A1 | 8/2006 |
| WO | 2009088295 A1 | 7/2009 |
| WO | 2019213716 A1 | 11/2019 |
| WO | 2021097348 A1 | 5/2021 |

OTHER PUBLICATIONS

Coast, Coast FL60R 450 Lumen Rechargeable LED Flashlight, Accessories Included, orange, Amazon Marketplace (Link: https://www.amazon.com/COAST-Rechargeable-Flashlight-Accessories-Included/dp/B07YFBRWWV6/ref=pd_Ipo_2?pd_rd_i=B07YFBRWW6&psc=1), US.

Coast, Coast FL78R 530 Lumen Rechargeable Tri-Color LED Headlamp with Twist Focus (https://www.amazon.com/COAST-FL78R-Rechargeable-Tri-Color-Headlamp/dp/B07W62W1M1), US.

Coast, Coast FL85R 700 Lumen Dual Color (White/Red) Focusing Rechargeable LED Headlamp, Rechargeable Battery Included (Amazon Marketplace (Link: https://www.amazon.com/Coast-Rechargeable-Focusing-Headlamp-Lumens/dp/B07NF65MGC), US.

Energizer, Energizer Rechargeable LED Headlamp, Water Resistant & Super Bright, Rugged Headlight for Camping, Running, Outdoors, Emergency Light, (USB Included), Amazon Marketplace (Link: https://www.amazon.com/Energizer-Vision-Ultra-Rechargeable-Resistant-Headlight-Emergency/dp/B07JD4KNKQ).

Illumagear: "Halo SL Product Demonstration," Apr. 17, 2020, XP093052948, retrieved from https://www.youtube.com/watch?v=KhyUiD60Um4.

International Search Report and Written Opinion issued in PCT/US2021/031450, dated Aug. 16, 2021, 11 pages.

Optimal Ventures LLC, Liteband ACTIV 400 Wide-Beam LED Headlamp—210° Illumination, 400 Lumens, Lightweight, Weatherproof, Rechargeable, USB-C, Red LED Mode—Camping, Running, Hiking, Fits Hard Hats, LBA400-L18N, Night, Amazon Marketplace, retrieved from https://www.amazon.com/Liteband-ACTIV-400-Wide-Beam-Headlamp/dp/B08C2BD737/ref=sr_1_2?keywords=LBA400+L18N&qid=1637104556&sr=8-2.

Optimal Ventures LLC, OV LED 802100 Broadbeam LED Headlamp, Ultra-Low Profile Durable Elastic Headband, 210° Illumination, 300 Lumens, 20 Bright LED Lights, 3 AAA Battery Powered, 3 Power Settings, Amazon Marketplace, retrieved from https://amazon.com/802100-Broadbeam-Headlamp-Ultra-Low-Illumination/dp/B07GT49F9C/ref=sr_1_19?dchild=1&keywords=headlamp+strap&qid=1608149644&sr=8-19.

Petzl, Petzl Actik Core Headlamp, REI Website, retrieved from https:/www.rei.com/product/163701/petzl-actik-coreheadlamp?color=RED.

Petzl, Petzl Tactikka Core Headlamp, REI Website, retrieved from https:/www.rei.com/product/163703/petzl-tactikka-coreheadlamp.

BROAD VIEW HEADLAMP

PRIORITY

This application is a continuation of and claims the benefit of priority to U.S. patent application Ser. No. 17/804,749 entitled "BROAD VIEW HEADLAMP" filed May 31, 2022, which is a continuation of and claims the benefit of priority to U.S. patent application Ser. No. 17/315,292 entitled "BROAD VIEW HEADLAMP" filed May 8, 2021, which claims the benefit of priority to U.S. Provisional Patent Application No. 63/022,487 filed on May 9, 2020, entitled "BROAD VIEW HEADLAMP", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention relates to headlamps with multiple lighting capabilities. More specifically, this invention relates to multi-mode headlamps that provide multiple lighting modes for illuminating different areas of interest.

DESCRIPTION OF RELATED TECHNOLOGY

Headlamps mount to the head of a user to provide hands-free lighting. Traditional headlamps typically include a spot beam and/or a flood beam to illuminate an area in front of the user. As an example, U.S. Pat. No. 7,226,190 to Petzl discloses a portable lighting lamp comprising an emitting module equipped with at least one light-emitting diode for emitting a light beam, a fixing and connecting element of said diode, and an optical focusing device able to be moved in front of the diode to make the visualization angle of the light beam vary. The optical focusing device is advantageously constituted by one or more Fresnel lenses mounted on a swiveling support or a rotary knob designed to occupy either an inactive position situated outside the light emission field of the diode or an active position wherein said tight beam passes through the lens so as to obtain either broad lighting with a short range or narrow lighting with a long range.

While useful, traditional headlamps do not provide peripheral or downward-disposed lighting, in addition to the forward-directed lighting. Thus, the user is required to move his/her head to re-direct the spot/flood beams to illuminate an area of interest. In an effort to address the peripheral lighting deficiency of traditional headlamps, wide-angle headlamps are designed to provide wide-angle lighting. Wide-angle headlamps include a number of LED lights positioned along a flexible strip or band to deliver wide-angle continuous lighting to provide front-on and peripheral lighting. While wide-angle headlamps are able to illuminate a broader area, they do not provide the capability to deactivate one or more of the lights to produce various lighting effects, such as front-on only or peripheral-only lighting. Further wide-angle headlamps do not utilize reflectors or lenses to provide directed, i.e., focused, lighting. Instead, the strip of LEDs simply casts a broad, non-focused spread of light. Additionally, as with traditional headlamps, wide-angle headlamps do not provide a capability for downward-directed lighting that can be used in addition to forward-directed lighting.

Based on the foregoing, there's a need in the art for a headlamp that provides any desired combination of forward-disposed lighting, far peripheral lighting, and/or downward-disposed lighting to improve the overall visibility capabilities of the user.

DETAILED DESCRIPTION

Figure 1:
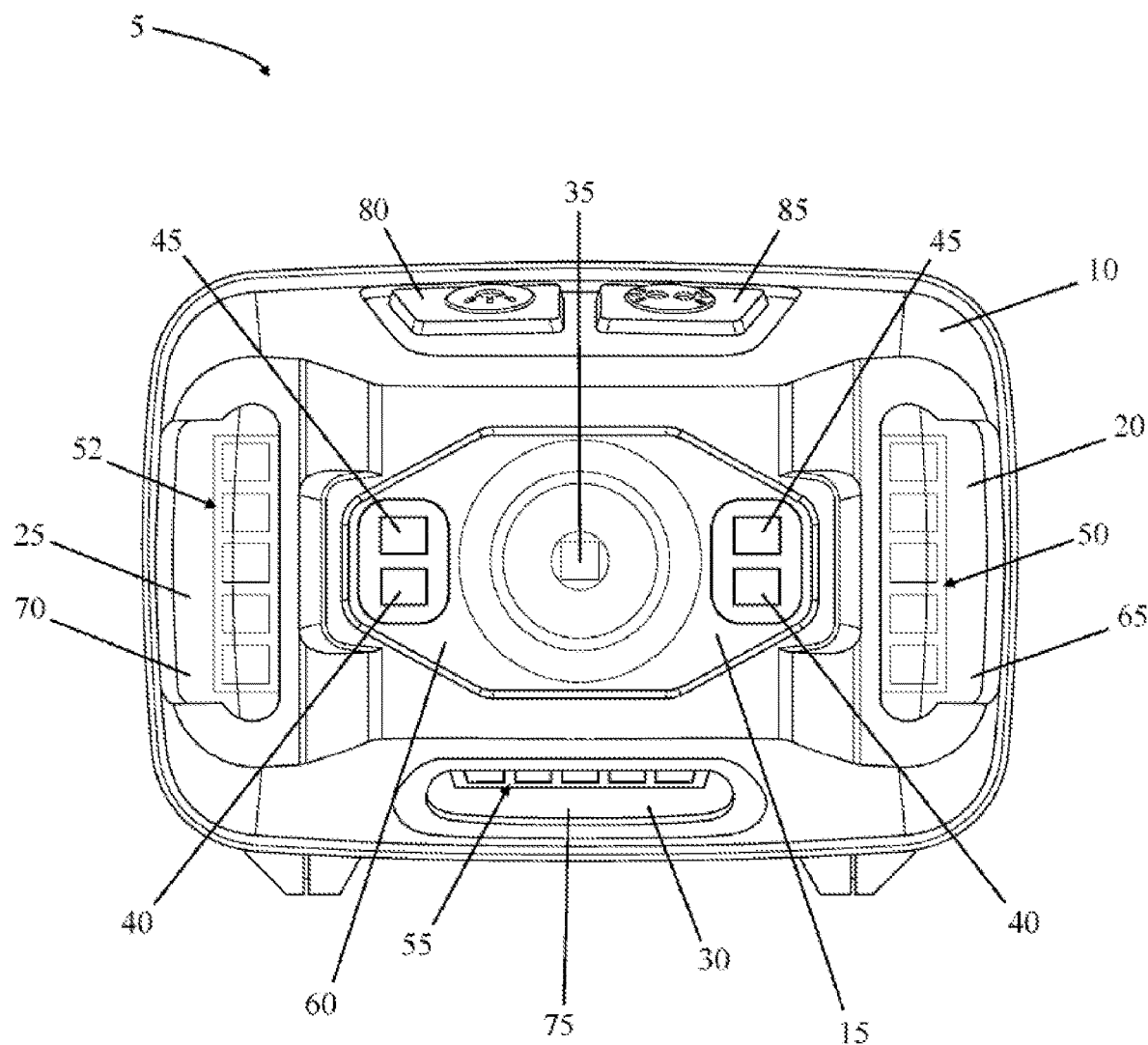
FIG. 1 shows a top-front perspective view of the broad view headlamp, according to an embodiment of the present invention.
Figure 2:
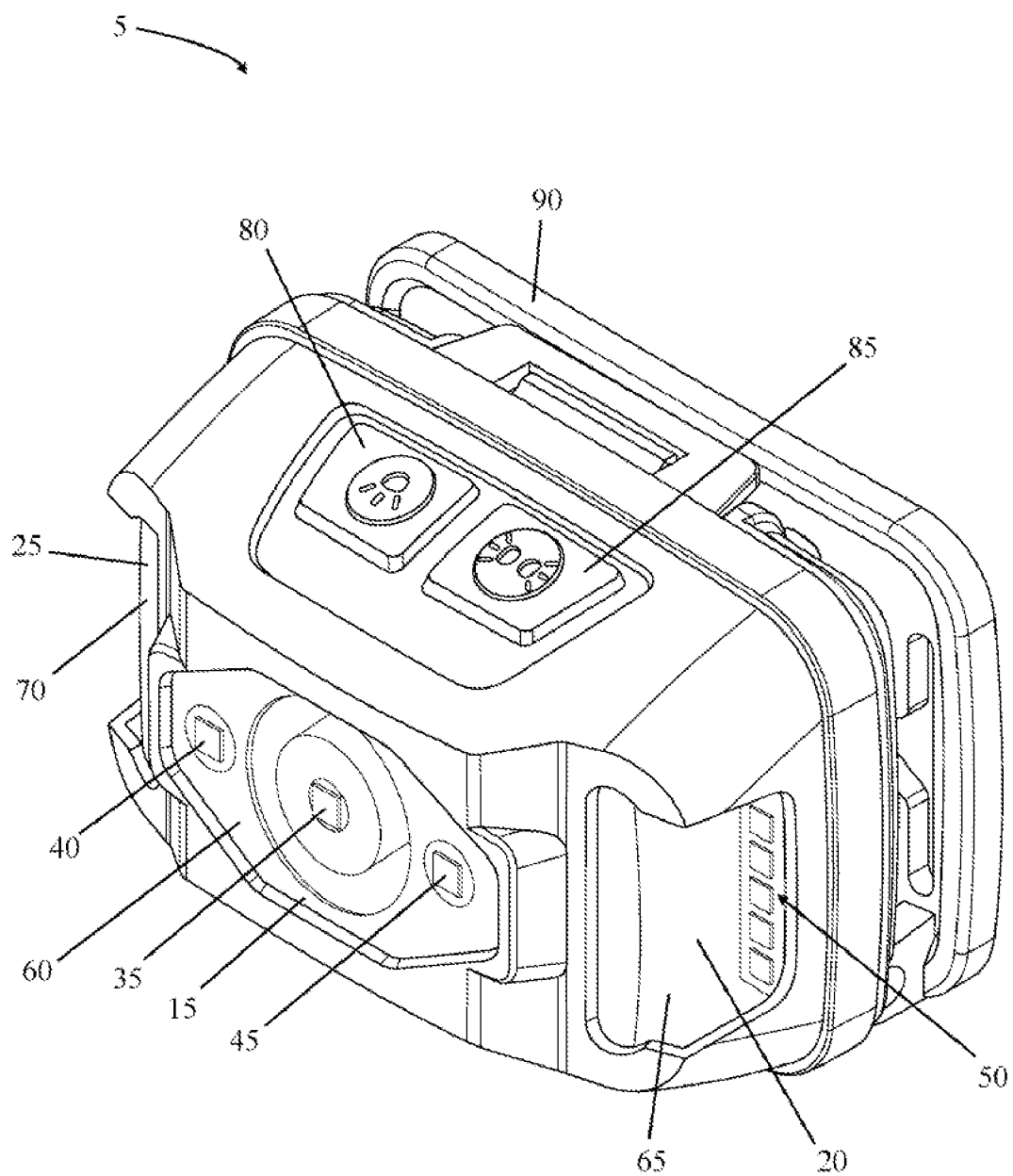
FIG. 2 shows a rear-bottom perspective view of the broad view headlamp, according to an embodiment of the present invention.
Figure 3:
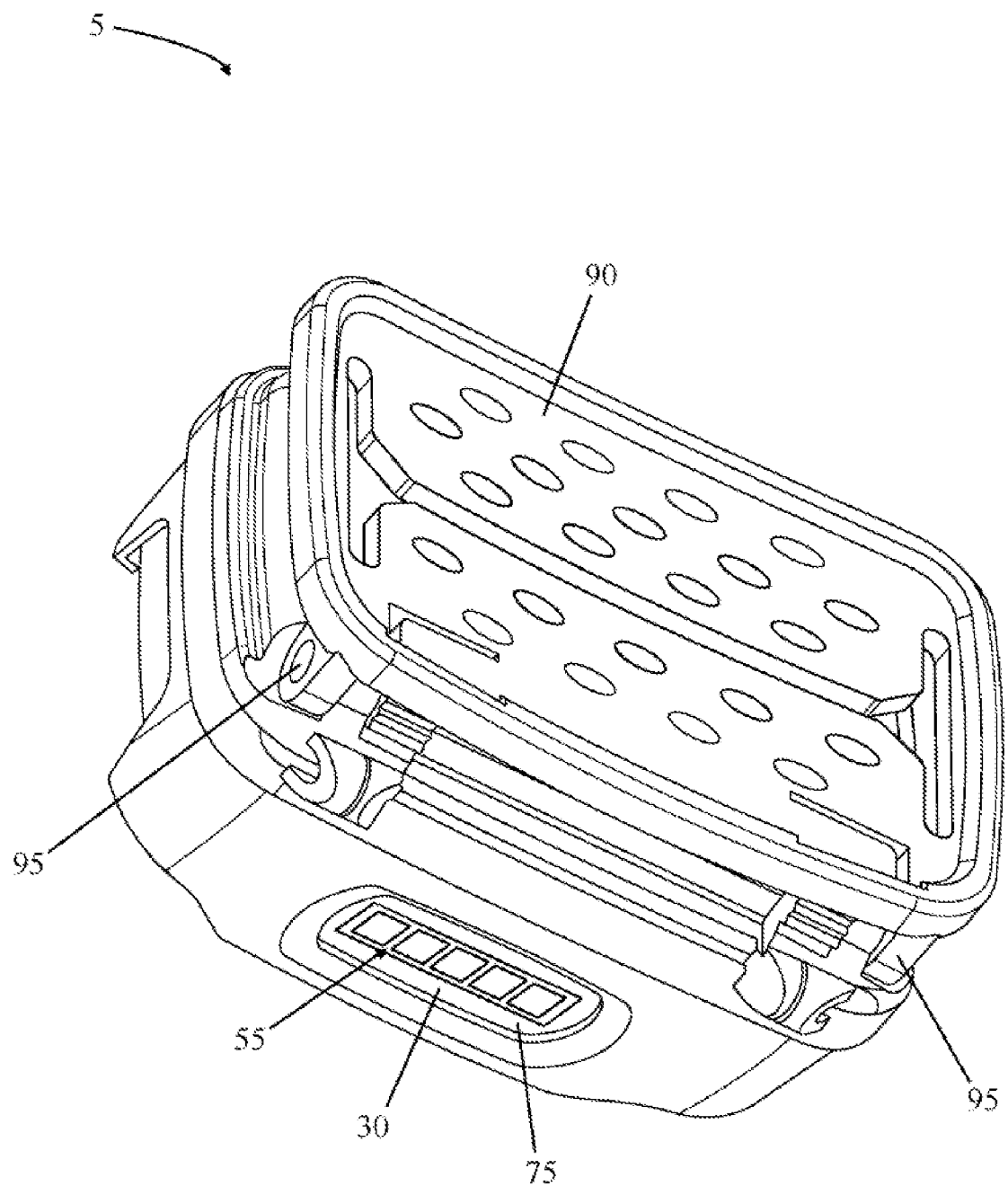
FIG. 3 shows a front elevational view of the broad view headlamp, according to an embodiment of the present invention.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Broad View Headlamp

With reference to FIGS. 1-5, headlamp 5 includes housing 10 having multiple lighting compartments 15, 20, 25, 30, each housing one or more light source 35, 40, 45, 50, 52, 55. Light sources 35, 40, 45, 50, 52, 55 are preferably comprised of one or more LEDs. In an embodiment, one or more of the lighting compartments 15, 20, 25, 30 contain, in addition to the LED(s), one or more reflectors to gather and direct light generated by the LED(s) to an area adjacent to, e.g., in front of, beside, behind, and/or below, headlamp 5. Additionally, each lighting compartment 15, 20, 25, 30 includes an optical lens 60, 65, 70, 75 configured to increase a degree of horizontal and vertical lighting and beam distance of light output by light sources 35, 40, 45, 50, 52, 55. The array of light sources 35, 40, 45, 50, 52, 55, together with the reflectors and optical lenses 60, 65, 70, 75, allows headlamp 5 to illuminate a view area extending to, at least, the outer boundaries of the far peripheral vision of the human eye, i.e., 110 degrees to the right and left of center. Thus, as opposed to traditional headlamps that typically illuminate a view area of approximately 30 degrees, the total view area illuminated by headlamp 5 is at least 220 degrees.

Housing 10 is designed to prevent infiltration of liquid into the interior of housing 10, including, but not limited to, the battery compartment (not shown) and lighting compartments 15, 20, 25, 30. Depending on the desired application, housing 10 may be designed with a certain degree of water-resistance, such that it can be exposed to water according to specified conditions, e.g., splashing, spraying, etc., without risk of water entering housing 10. Alternatively, housing 10 may be designed to be completely waterproof, such that housing 10 can be fully submerged in water to pre-defined depths without risk of water entering housing 10.

Light sources 35, 40, 45, 50, 52, 55 can be activated individually or in combination with one or more of the other light sources 35, 40, 45, 50, 52, 55, depending on the desired lighting effect. For example, light source 35 can be activated to provide focused beam, i.e., spot beam, lighting in front of headlamp 5; light source 40 can be activated to provide broad-beamed, i.e., flood beam, lighting in front of headlamp 5; light source 45 can be activated to provide night vision lighting, e.g., red or blue-green light, in front of headlamp 5; light sources 50, 52 can be activated to provide wide-angle, i.e., far peripheral, lighting to the sides/rear of headlamp 5; or light source 55 can be activated to provide downwardly-disposed lighting below headlamp 5. Additionally, light sources 35, 40, 45, 50, 52, 55 can be activated in any combination to provide unique lighting options, based on the user's specific environmental needs. For example, with headlamp 5 positioned at the front of the user's head, if the user only wants to illuminate areas in his/her periphery and at the ground surface, he/she can activate only light sources 50, 52, 55. As another example, if the user only wants to illuminate the area forward of the user and at the ground surface, he/she can activate one or both of light sources 35/40 in combination with light source 55. As yet another example, if the user only wants to illuminate the area forward of himself/herself and areas in his/her periphery, he/she can activate one or both of light sources 35/40 in combination with light sources 50, 52. These examples are for illustrative purposes only, and should not be construed as limiting the lighting capabilities of the present invention to any particular lighting combinations.

Multifunctional switches 80, 85 are used to power-on/off and operate headlamp 5. In a preferred embodiment, as shown in the figures, switches 80, 85 are push-button switches. Switches for operating electronic devices are known to those skilled in the art and can be embodied in a number of ways other than that as illustrated. As such, other types of switches (other than those shown) could be employed with the present invention without deviating from the scope of the invention.

Once powered on, switches 80, 85 may be used for various functions, including, for example, switching between lighting modes, locking/unlocking operation/functionality of switches 80, 85, dimming light sources 35, 40, 45, 50, 52, 55, and setting a power-off timer (e.g., 15 minutes, 30 minutes, 1 hour, 2 hours, etc.) for powering off headlamp 5. In an embodiment, the functions of switches 80, 85 are executed based on a pre-determined action sequence, e.g., a 3-second press/touch-and-hold of one or both of switches 80, 85, a single press/tap and release, or a fast double press/tap and release or hold of one of switches 80, 85. For example, switches 80, 85 may be configured to power-on/off headlamp, based on a 3-second press/touch-and-hold of one or both of switches 80, 85. Once powered on, a single press/touch and release of switch 80 may be configured to toggle or switch between lighting modes; whereas, a single press/touch and release of switch 85 may be configured to set a power-off timer. Likewise, a fast double press/tap and hold of switch 80 may be configured to lock/unlock operation of switches 80, 85; whereas, a fast double press/tap and hold of switch 85 may be configured to dim the currently-activated light sources 35, 40, 45, 50, 52, 55 (or return lights to full brightness if currently in a dimmed setting). The foregoing examples are provided for illustrative purposes only, and are not meant to limit the scope of the present invention in any way. Switches 80, 85 can be pre-configured in any way to accomplish the desired functions. Likewise, additional switches (not shown) may be added to execute the various functions of headlamp 5.

Light sources 35, 40, 45, 50, 52, 55 and switches 80, 85 are in electrical communication with a lighting control module (not shown) within headlamp 5. The lighting control module is configured to receive, interpret, and execute user commands input by way of switches 80, 85. Circuitry and other mechanisms for operating a device using switches are known to those skilled in the art and can be carried out in a number of ways. Any such circuitry or mechanism can be used with the present invention without deviating from the scope of the invention.

The lighting control module is in electrical communication with a battery (not shown). In some embodiments, headlamp 5 may be configured to receive power from only one battery type, e.g., single-use (i.e., dry cell) batteries or rechargeable batteries (e.g., lithium-ion batteries). Alternatively, headlamp 5 may be configured as a dual power, or hybrid power, device, whereby it is configured to receive power from multiple battery types, e.g., single-use (i.e., dry cell) batteries or rechargeable batteries (e.g., lithium-ion batteries). For embodiments that employ rechargeable batteries, a charging dock or other charging apparatus/technology (not shown) may be used for recharging the batteries. Charging may be accomplished via any known technology known in the art, including, but not limited to, wired charging and/or inductive charging.

A heatsink assembly (not shown) may be required to keep the operating temperature of light sources 35, 40, 45, 50, 52, 55 at an acceptable operating temperature. Further disclosure of LED heatsinks is not considered necessary as they are known to those of skill in the art. Any known heat sinking method and/or configuration may be used with the present invention.

Panel 90 is coupled to the rear of headlamp 5 by hinges 95, allowing panel 90 to transition between an open and closed position. In the closed position, the edge of panel 90 opposite hinges 95 releasably engages the rear of headlamp using, for example, a releasable fastener as shown in the figure to secure panel 90 in the closed position. When released, panel 90 pivots open to, among other things, provide access to the battery compartment (not shown) and/or facilitate coupling or decoupling of headband 100 to/from headlamp 5, as shown in FIGS. 4-5.

Figure 4:
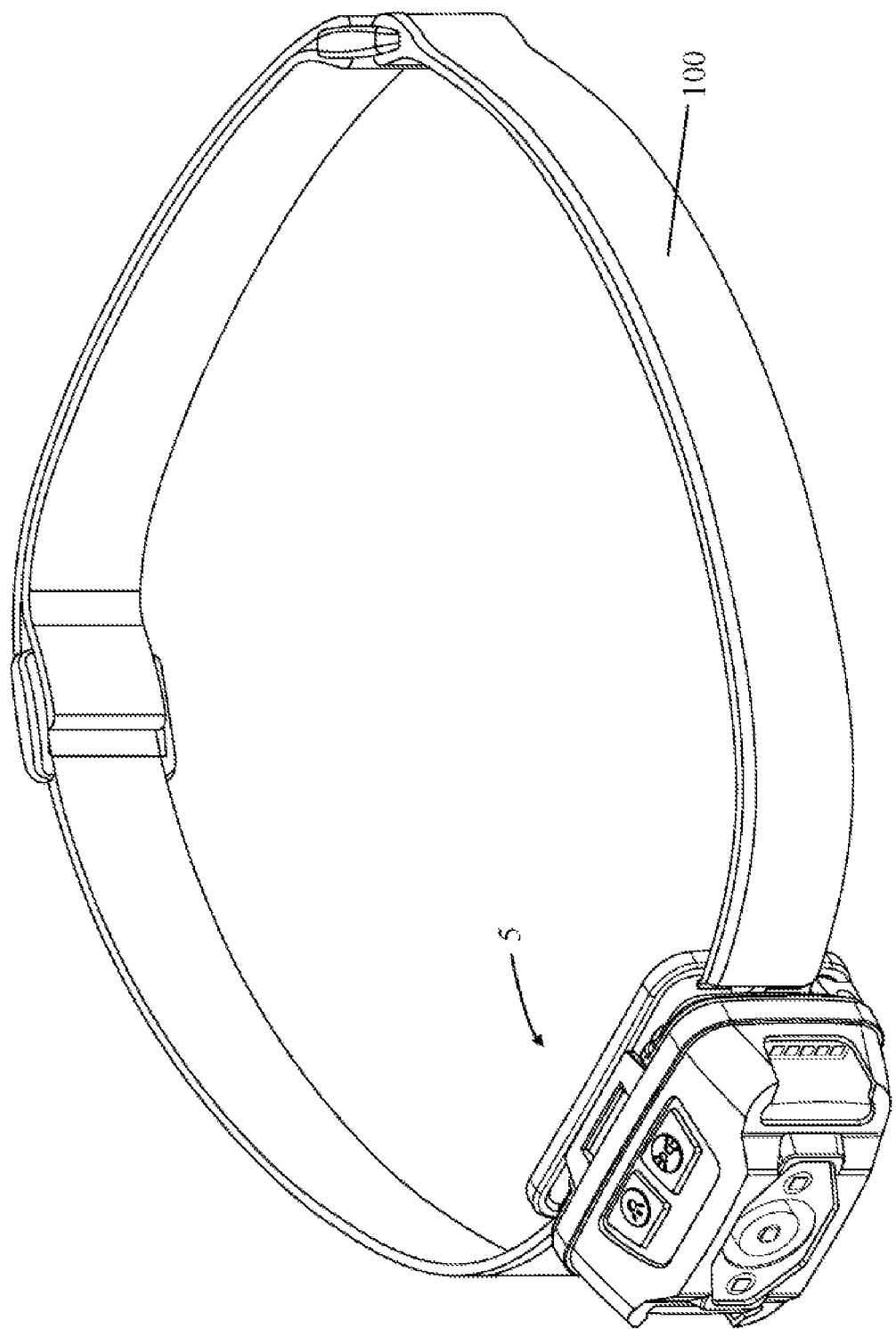
FIG. 4 shows a top-front perspective view of the broad view headlamp with a head strap attached, according to an embodiment of the present invention.
Figure 5:
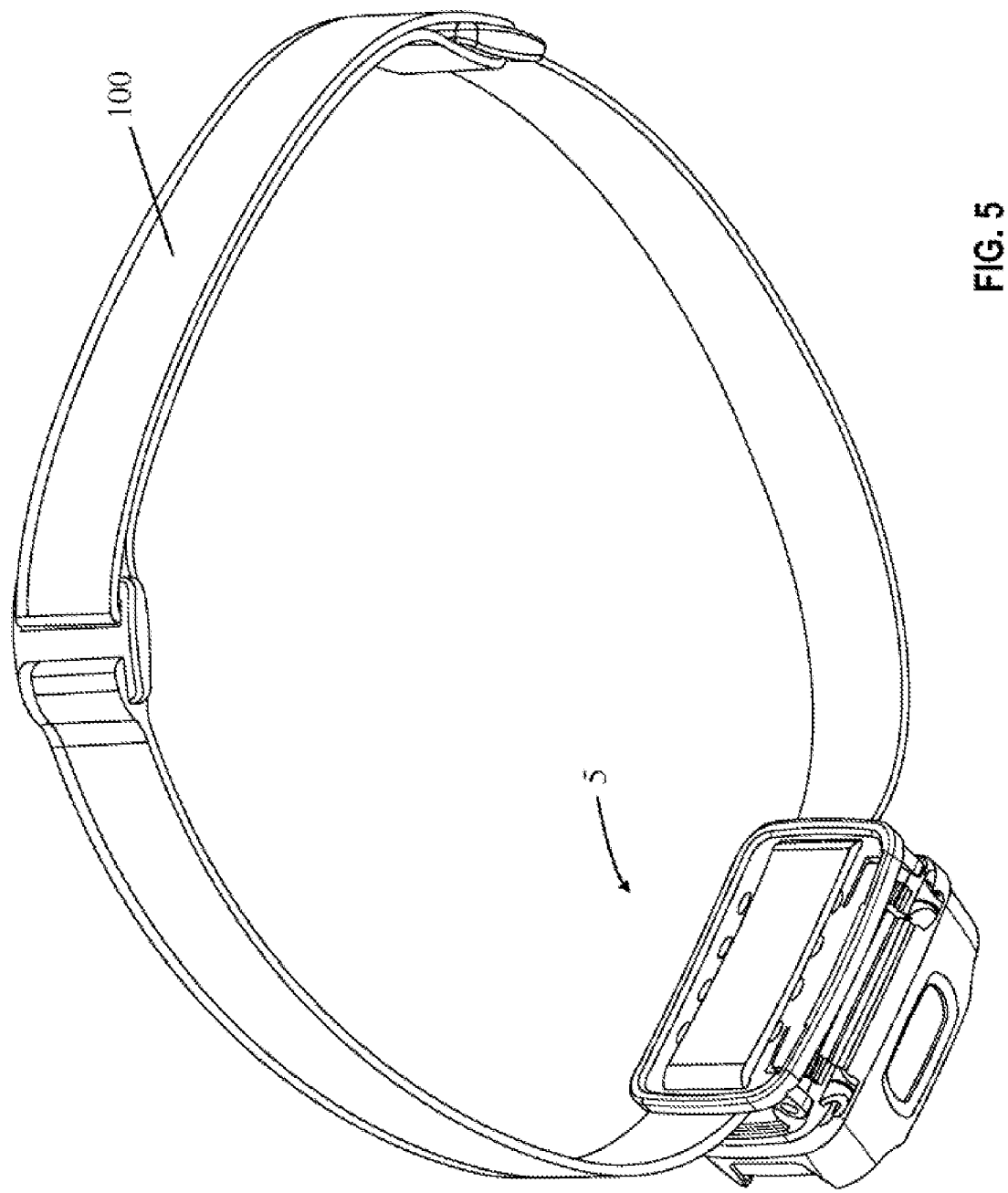
FIG. 5 shows a rear-bottom perspective view of the broad view headlamp with a head strap attached, according to an embodiment of the present invention.

In a preferred embodiment, as shown in FIGS. 4-5, headlamp 5 includes headband 100 for securing headlamp 5 to the user's head. Headband 100 is adjustable and is configured to encircle the head of a user (not shown), thereby supporting headlamp 5 on the user's head. The size of headband 100 may be secured at a desired diameter to fit the head of the user by a locking mechanism. A variety of securing mechanisms that will secure headband 100 at a desired size are well known to those of skill in the art. Therefore, the invention is not limited to any particular securing mechanism. In an embodiment, headband 100 has an adjustable, over-the-head support band (not shown). Just as with the securing mechanism for headband 100; securing mechanisms used to hold the over-the-head support are well known to those of skill in the art. Therefore, the invention is not limited to any particular securing mechanism. In lieu of using headband 100, headlamp may be secured to an object (not shown), e.g., eyewear (glasses, goggles, etc.), hats, etc. using a variety of securing mechanisms known to those of skill in the art. Therefore, headlamp 5 should not be construed as being limited to use with headband 100.

In various embodiments, headlamp 5 includes one or more sensors (not shown). Example sensors include, but are not limited to, an ambient light sensor, an inertial sensor (e.g., an accelerometer and/or a gyroscopic sensor), a motion sensor (e.g., a PAIR sensor, a microwave sensor, etc.), a heat sensor, a voltage detection sensor, a distance sensor, or any other sensor that can be used to detect changes in conditions of or external to headlamp 5. The sensors are in electrical communication with the control module, which is configured to receive real-time data from the sensor(s) and intuitively initiate/adjust lighting conditions/operations of headlamp 5 in real-time. For example, based on data received from the sensor(s), the control module may be configured to adjust the intensity/output of one or more light sources 35, 40, 45, 50, 52, 55, initiate or adjust lighting modes, initiate a low-power standby mode, "wake" headlamp 5 from the standby/sleep mode, etc.

In various embodiments, the control module is configured to initiate and/or adjust lighting settings of headlamp 5, based on data received from the sensors and pre-programmed logic stored in memory of the control module. For example, in an embodiment, the control module is configured to compare the data received from the sensor(s) to one or more threshold values stored in the memory, wherein the control module is configured to adjust the lighting device output modes and intensity of one or more light sources 35, 40, 45, 50, 52, 55 only when the threshold value(s) are met or exceeded. Additionally, the sensor(s) may be pre-programmed with one or more threshold values for detecting motion, wherein the sensor(s) are configured to transmit data to the control module only when the threshold value(s) are met or exceeded.

An ambient light sensor may be used to detect and measure light intensity external to the multipurpose lighting device. In an embodiment, the control module includes program logic configured to select and adjust lighting output modes and initiate and adjust an intensity of one or more light sources 35, 40, 45, 50, 52, 55 using pulse width modulation brightness controls responsive to the ambient light sensor data.

An inertial sensor and/or a motion sensor may be used to detect motion of or external to headlamp 5. In an embodiment, if motion of or external to headlamp 5 is not detected for a pre-configured amount of time, the control module is configured to initiate a standby mode. Upon initiation of the standby mode, the control module may be configured to save current state settings and disable all peripherals except one or more sensors, e.g., the inertial sensor, the motion sensor, and/or the ambient light sensor. If, during the standby mode, motion is detected for a pre-configured amount of time, the control module is configured to initiate an operating mode. In an embodiment, the operating mode is a lighting mode in use immediately preceding initiation of the standby mode. In an embodiment, the control module is configured to disrupt the standby mode if the control module detects a low battery condition during the standby mode. In a further embodiment, if the standby mode is disrupted due to detection of the low battery condition, the control module is configured to initiate a dim lock mode upon disruption of the standby mode.

In an embodiment, the control module is able to modify lighting output (e.g., initiate a lighting mode, change lighting mode, alter lighting intensity, etc.) in real-time in response to sensor data indicating user gestures (e.g., a hand wave, a bump, etc.) and/or conditions external to headlamp 5 (e.g., changes in ambient light levels, etc.). In an embodiment, the control module includes logic pre-programmed to identify the occurrence of gestures or changes in conditions external to headlamp 5, based on analysis of data received from the sensor(s).

A voltage detection sensor may be used to monitor real-time voltage levels of the battery(ies). The control module is configured to compare real-time battery voltage information received from the voltage detection sensor to battery threshold values stored in memory to determine if a current mode of operation needs to be adjusted. In an embodiment, the control module is configured to automatically adjust power consumption of headlamp 5, based on remaining battery life measured by the control module. In an embodiment, the control module is configured to initiate a dim mode if a low battery condition is detected. If a low battery condition is detected, the control module is configured to activate a visual and/or audio indicator, e.g., a low battery light and/or audible beep, to indicate the low battery condition to the user.

A distance/proximity sensor may be used to detect nearby objects and determine distance to target. Based on the distance to target determined by the sensor, the control module is configured to increase or decrease light intensity. For example, if the light(s) is/are directed to a close-proximity manual being read by the user, the control module would reduce the light intensity and increase spread, based on proximity information from the sensor. Alternatively, if the light(s) is/are directed at a distant target, the control module would increase the light intensity and reduce spread, based on proximity information from the sensor, to concentrate the light on the distant target. The distance sensor may perform measurements to targets using any measurement detection means (e.g., lasers, sound waves, etc.) known in the art.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A headlamp, comprising:
    a plurality of light sources disposed within a housing;
    a motion sensor configured to determine motion external to the headlamp;
    a multifunctional switch; and
    a lighting control module configured to:
        select a first mode from a plurality of lighting modes based on the multifunctional switch;
        receive motion sensor data from the motion sensor;
        determine a lack of motion is detected for a threshold period based on the motion sensor data; and
        initiate a standby mode of the plurality of lighting modes based on the lack of motion.

2. The headlamp of claim 1, further comprising a memory, where the lighting control module is further configured to save state settings associated with the first mode to the memory based on initiating the standby mode.

3. The headlamp of claim 1, where the lighting control module is further configured to:
    receive additional motion sensor data from the motion sensor;
    determine a motion is detected for a second threshold period based on the additional motion sensor data; and
    initiate the first mode based on the motion is detected.

4. The headlamp of claim 3, where the lighting control module is further configured to:
    save state settings associated with the first mode based on initiating the standby mode; and
    retrieve the state settings associated with the first mode based on initiating the first mode.

5. The headlamp of claim 1, further comprising an inertial sensor configured to determine motion of the headlamp, where:
    the lighting control module is further configured to receive inertial sensor data from the inertial sensor, and
    determining the lack of motion is detected is further based on the inertial sensor data.

6. The headlamp of claim 1, where the lighting control module is further configured to:
    detect a low power condition of the headlamp; and
    disrupt the standby mode based on the low power condition.

7. The headlamp of claim 6, further comprising a voltage sensor, where the lighting control module is further configured to receive voltage sensor data about one or more power source of the headlamp from the voltage sensor, and detecting the low power condition is based on the voltage sensor data.

8. The headlamp of claim 6, where the lighting control module is further configured to dim one or more of the plurality of light sources based on the low power condition.

9. The headlamp of claim 8, where the lighting control module is further configured to:
    receive input from the multifunctional switch following dimming the one or more of the plurality of light sources, and
    undim the one or more of the plurality of light sources based on the input.

10. The headlamp of claim 1, further comprising:
    a headband; and
    an over-the-head support band, where the headband and the over-the-head support band is coupled to the housing.

11. A headlamp, comprising:
    a first light source configured to illuminate a first view area in a first fixed direction from the headlamp;
    a second light source configured to illuminate a second view area in a second fixed direction from the headlamp; and
    a lighting control module configured to selectively activate the first light source and the second light source according to a plurality of lighting modes, the plurality of lighting modes comprises a first lighting mode that activates the first light source and the second light source to illuminate the first view area and the second view area to create a total combined view area that is wider than either the first view area or the second view area alone.

12. The headlamp of claim 11, further comprising a plurality of forward-directed light sources, where the plurality of lighting modes comprises at least a focused lighting mode that creates a spot beam from at least one light source of the plurality of forward-directed light sources and a broad-beamed lighting mode that creates a flood beam from at least another light source of the plurality of forward-directed light sources.

13. The headlamp of claim 11, further comprising a night vision light source configured to emit a red or blue-green light, where the plurality of lighting modes comprises at least a night vision lighting mode that activates the night vision light source.

14. The headlamp of claim 11, where:
    the first light source is configured to illuminate a first peripheral side of the headlamp,
    the first light source comprises a first light emitting diode, a first reflector, and a first lens,
    the first reflector of the first light source is configured to direct light from the first light emitting diode to the first peripheral side of the headlamp,
    the first lens of the first light source is configured to increase a third width of the first light emitting diode to a first width of the first view area,
    the second light source is configured to illuminate a second peripheral side of the headlamp,
    the second light source comprises a second light emitting diode, a second reflector, and a second lens,
    the second reflector of the second light source is configured to direct light from the second light emitting diode to the second peripheral side of the headlamp,
    the second lens of the second light source is configured to increase a fourth width of the second light emitting diode to a second width of the second view area, and the plurality of lighting modes comprises at least a periphery-only lighting mode that illuminates only the first peripheral side and the second peripheral side.

15. The headlamp of claim 11, further comprising:
a battery compartment configured to hold one or more batteries; and
a low-battery-indicator light,
where the lighting control module is further configured to:
  determine a remaining charge of the one or more batteries in the battery compartment,
  detect a low battery condition based on the remaining charge, and
  activate the low-battery-indicator light based on the low battery condition.

16. The headlamp of claim 11, further comprising:
a battery compartment configured to hold one or more batteries; and
a speaker,
where the lighting control module is further configured to:
  determine a remaining charge of the one or more batteries in the battery compartment,
  detect a low battery condition based on the remaining charge, and
  emit a noise from the speaker based on the low battery condition.

17. A headlamp, comprising:
a first light source;
a one or more sensors;
a multifunctional switch; and
a control module configured to:
  select a first mode from a plurality of operating modes based on the multifunctional switch;
  detect a first gesture based on input from the one or more sensors; and
  adjust the first mode based on the first gesture.

18. The headlamp of claim 17, where the one or more sensors comprise at least one of an inertial sensor and a motion detection sensor.

19. The headlamp of claim 17, where the first gesture comprises a hand wave or a bump.

20. The headlamp of claim 17, where:
the one or more sensors comprise an ambient light sensor,
the control module is configured to receive ambient light data from the ambient light sensor, and
adjusting the first mode is further based on the ambient light data.

* * * * *